US 11,934,721 B1

(12) United States Patent
Matsuo (10) Patent No.: US 11,934,721 B1
(45) Date of Patent: Mar. 19, 2024

(54) INDUSTRIAL PRINTING SYSTEM, PRINT SERVER, AND VARIABLE PRINTING METHOD FOR DISTRIBUTED PROCESSING OF VARIABLE CONTENT IN VARIABLE PRINTING OF PRODUCTION PRINTING BY PEER-TO-PEER (71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/121,566

(22) Filed: Mar. 14, 2023

(51) Int. Cl.
*G06F 3/12* (2006.01)
*H04N 1/32* (2006.01)

(52) U.S. Cl.
CPC .......... *G06F 3/1243* (2013.01); *G06F 3/1213* (2013.01); *H04N 1/3255* (2013.01); *G06F 3/1282* (2013.01); *G06F 3/1288* (2013.01)

(58) Field of Classification Search
CPC .... G06F 3/1288; G06F 3/1282; G06F 3/1213; G06F 3/1243; H04N 1/3255
See application file for complete search history.

(56) References Cited

U.S. PATENT DOCUMENTS

| 6,519,053 B1 * | 2/2003 | Motamed | G06F 3/1211 358/404 |
| 9,063,921 B1 * | 6/2015 | Cogan | G06F 40/103 |
| 2003/0128384 A1 * | 7/2003 | Nelson | G06F 3/1217 358/1.15 |
| 2008/0079976 A1 * | 4/2008 | van de Capelle | G06F 3/1205 358/1.13 |
| 2010/0079788 A1 * | 4/2010 | Kodera | G06F 3/1211 358/1.15 |
| 2015/0156351 A1 | 6/2015 | Yamamoto | |

FOREIGN PATENT DOCUMENTS

JP 2015-107555 A 6/2015

* cited by examiner

*Primary Examiner* — John R Wallace
(74) *Attorney, Agent, or Firm* — Hawaii Patent Services; Nathaniel K. Fedde; Kenton N. Fedde (57) ABSTRACT

Provided is an industrial printing system that performs peer-to-peer distributed processing of variable content in variable printing for production printing. A variable attribute generating unit generates variable attribute information having content information that is variable content information of variable data for variable printing. A variable analyzing unit analyzes the content information of the variable attribute information generated by the variable attribute generating unit and determines other print server capable of processing the variable content of the variable data. A processing management unit that requests the other print server determined to be capable of processing by the variable analyzing unit to process the variable content.

12 Claims, 8 Drawing Sheets

```xml
<variable-data>
    <variable-content>
        <Content Type="Image" ID="IMG001">
            <color-profile>Adobe RGB ICC</color-mode>
            <spot-color>PANTONE 639C</spot-color>
        </Content >
        <Content Type="Image" ID="IMG002">
            <color-profile>sRGB ICC</color-mode>
            <spot-color>PANTONE 638C</spot-color>
        </Content >
        <Content Type="Image" ID="TXT001">
            <font>Hiragino Kaku Gothic</color-mode>
        </Content >
    </variable-content>
    <variable-recode>
        <Record recode-number=1>
            <primary-key>CI-001</ primary-key>
            <pages>
                <start-page>1</start-page>
                <end-page>2</end-page>
            </pages>
            <ContentRef rRef ="IMG001">
        </Record>
        <Record recode-number=2>
            <primary-key>CI-002</ primary-key>
            <pages>
                <start-page>3</start-page>
                <end-page>4</end-page>
            </pages>
            <ContentRef rRef ="IMG002">
        </Record>
        .....
    </variable-recode>
</variable-data>
```

330 — (variable-content block)
340 — (variable-recode block)
210

```
<variable-data>
  <variable-content>
    <Content Type="Image" ID="IMG001" URL="http://xxxx/xxx/xxx>
      <color-profile>Adobe RGB ICC</color-mode>
      <spot-color>PANTONE 639C</spot-color>
    </Content >
  </variable-content>
</variable-data>
```

INDUSTRIAL PRINTING SYSTEM, PRINT SERVER, AND VARIABLE PRINTING METHOD FOR DISTRIBUTED PROCESSING OF VARIABLE CONTENT IN VARIABLE PRINTING OF PRODUCTION PRINTING BY PEER-TO-PEER

BACKGROUND

The present disclosure particularly relates to an industrial printing system, a print server, and a variable printing method that perform variable printing in industrial printing (production printing).

Among print systems that typically include a plurality of printers, there are print systems that perform so-called ubiquitous printing. In this system, when a print system including a plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the order that is preset from the first MFP to the Nth MFP. This saves the ubiquitous job in the memory of the MFP that can process it. As a result, in the printing system, it is possible to reduce the waiting time until the user obtains the printed matter.

That is, in this typical technique, print data (job) is transferred to each MFP, and it is determined whether or not the transferred MFP itself can process the data.

On the other hand, in industrial printing called production printing, which uses a commercial (industrial) printing apparatus, the component members of the final product are produced by dividing the work into a plurality of processes. For example, in the case of bookbinding, covers, body (color), body (black and white), promotional items, bands, shipping envelopes, or the like, are processed as different jobs. Then, in the middle of the process, each job is combined and finished as a book as the final product.

Furthermore, in recent years, in digital printing for production printing, industrial printing called variable printing, in which output changes for each record, has been performed. Variable printing is used for personalized printed matter, and the like. Variable printing is one of the purposes for which printing companies introduce digital production printing apparatuses.

SUMMARY

An industrial printing system according to the present disclosure is an industrial printing system having a plurality of print servers and performs variable printing for production printing, each of the plurality of print servers including: a variable attribute generating unit that generates variable attribute information having content information that is variable content information of variable data for variable printing; a variable analyzing unit that analyzes the content information of the variable attribute information generated by the variable attribute generating unit and determines other print server capable of processing the variable content of the variable data; and a processing management unit that requests the other print server determined to be capable of processing by the variable analyzing unit to process the variable content.

A print server according to the present disclosure is a print server for an industrial printing system that performs variable printing for production printing, including: a variable attribute generating unit that generates variable attribute information having content information that is variable content information of variable data for variable printing; a variable analyzing unit that analyzes the content information of the variable attribute information generated by the variable attribute generating unit and determines other print server capable of processing the variable content of the variable data; and a processing management unit that requests the other print server determined to be capable of processing by the variable analyzing unit to process the variable content.

A variable printing method according to the present disclosure is a variable printing method performed by an industrial printing system having a plurality of print servers performing variable printing for production printing, including the steps of: generating variable attribute information having content information that is variable content information of variable data for variable printing; analyzing the content information of the generated variable attribute information; determining other print server capable of processing the variable content of the variable data; and requesting the other print server determined to be capable of processing to process the variable content.

DETAILED DESCRIPTION

Embodiment

[Configuration of Industrial Printing System X]

Figure 1:
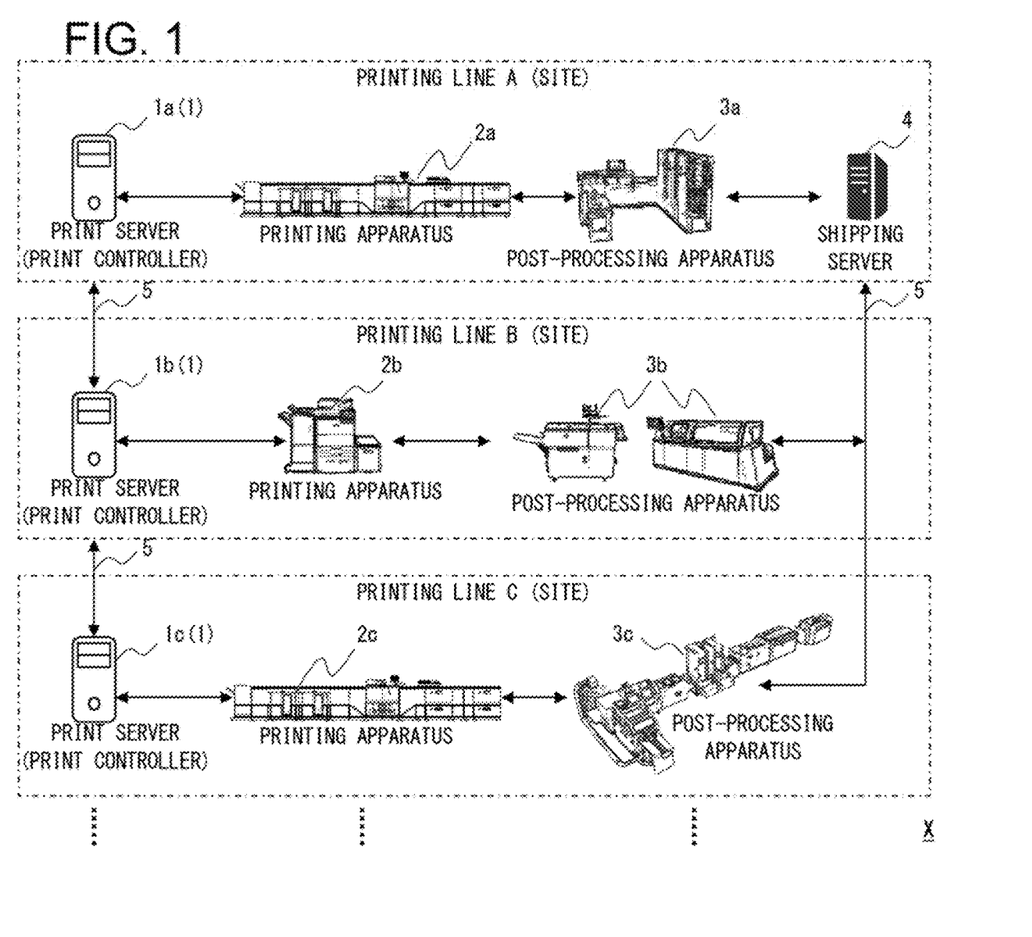
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing process and a post-processing process (hereinafter also simply referred to as "printing") in industrial printing (production printing).

Here, in the industrial printing system X according to the present embodiment, the final product such as a book to be output is defined as an "order", and the variable document data 200 (FIG. 3) is printed as the order.

The industrial printing system X includes sites (printing line) of a printing company, a printing factory, and the like, and each site is connected to a network 5 and is cooperated. Each site includes a print server 1 and component apparatuses (groups) such as a printing apparatus 2, a post-processing apparatus 3, a shipping server 4, or the like.

In FIG. 1, an example of the coordination between the sites is shown in which the print servers 1a, 1b, 1c, and . . . of print lines A, B, C, and . . . , as well as the shipping server 4 of print line A, are connected with the network 5. Furthermore, in this example, the printing apparatuses 2 and the post-processing apparatuses 3 are connected to each of the printing lines A, B, C, . . . .

Hereinafter, any one of these print 1a, 1b, 1c, . . . is simply refer to as print server 1.

The print server 1 is an information processing apparatus serving as a print controller that manages and controls printing-related apparatuses (hereinafter referred to as "component apparatuses") including the printing apparatus 2 and post-processing apparatus 3 provided at each site. The print server 1 is composed of a PC (Personal Computer) server, a dedicated machine, a general-purpose machine, or the like.

In the present embodiment, the print server 1 executes dedicated print management (order output management) application software (hereinafter simply referred to as "application") to perform peer-to-peer distributed processing of production printing of variable document data 200 (FIG. 3) for production printing. This print management application (hereinafter referred to as "dedicated application") may execute on a common that platforms that performs print design creation, user management, tenant management, security management, maintenance notification service, prepress processing management, storage management of each document, management of the printing apparatus 2, or the like.

Specifically, in production printing, the print server 1 transmits and receives various instructions and information to and from the printing apparatus 2, the post-processing apparatus 3, the shipping server 4, and the like. As a result, the print server 1 manages the status of each apparatus and requests processing of variable contents of the variable document data 200.

In the present embodiment, the print server 1 is the print server 1 on the side of requesting (hereinafter referred to as the "own print server") or the print server 1 on the side of being requested processing (hereinafter referred to as the "other print server"). Between them, processing requests for variable content are made.

The printing apparatus 2 may be an industrial printer including an image forming apparatus, an automated offset printing apparatus, or the like. The printing apparatus 2 is capable of executing a process of printing step such as small-lot printing or large-volume (multi-lot) offset printing, or the like.

The post-processing apparatus 3 is a post-processing apparatus for executing a process of post-processing step such as folding, collating, bookbinding, cutting, bookbinding, or the like, of recording paper printed by the printing apparatus 2.

The shipping server 4 is a server that manages the shipping of the order sent from each site after the printing step and the post-processing step are completed.

In the present embodiment, an example by using the shipping server 4 at the site of the printing line A is described. However, the shipping server 4 may be provided at the other sites as well.

The network 5 is a LAN (Local Area Network), a wireless LAN (Wi-Fi), a mobile phone network, the other WAN (Wide Area Network), an industrial network, a voice telephone network, other dedicated line, or the like. The network 5 can transmit and receive various commands and data to and from each apparatus. Furthermore, the print server 1 and each component apparatus may also be connected via a LAN, or the like, of the network 5. In addition, the network 5 may be configured with a VPN (Virtual Private Network), or the like.

In addition, a plurality of these apparatuses may exist according to the application, the scale of printing, and the like. Each apparatus can be connected to the print server 1 by various protocols via the network 5, LAN, or the like. Alternatively, the print server 1 and each apparatus may be directly connected by wire using various interfaces.

Further, each site may have other component apparatuses managed by the print server 1. The other component apparatuses include, for example, a terminal for manuscript submission, a terminal for design proofreading, a prepress apparatus, and the like.

Furthermore, an administrator terminal or a general terminal used by a user such as an administrator of printing, or the like, may be connected via the network 5 from inside and outside each site. The general terminal may include a so-called console.

As a result, each print server 1 can be accessed by a user by using a web browser, a terminal, a dedicated application, or the like, and by using an administrator terminal, a general terminal, or the like. As a result, it is possible to acquire the variable document data 200, design the print, submit the manuscript, manage the prepress process, check the progress status, request the process, and the like.

[Control Configuration of Print Server 1]

Figure 2:
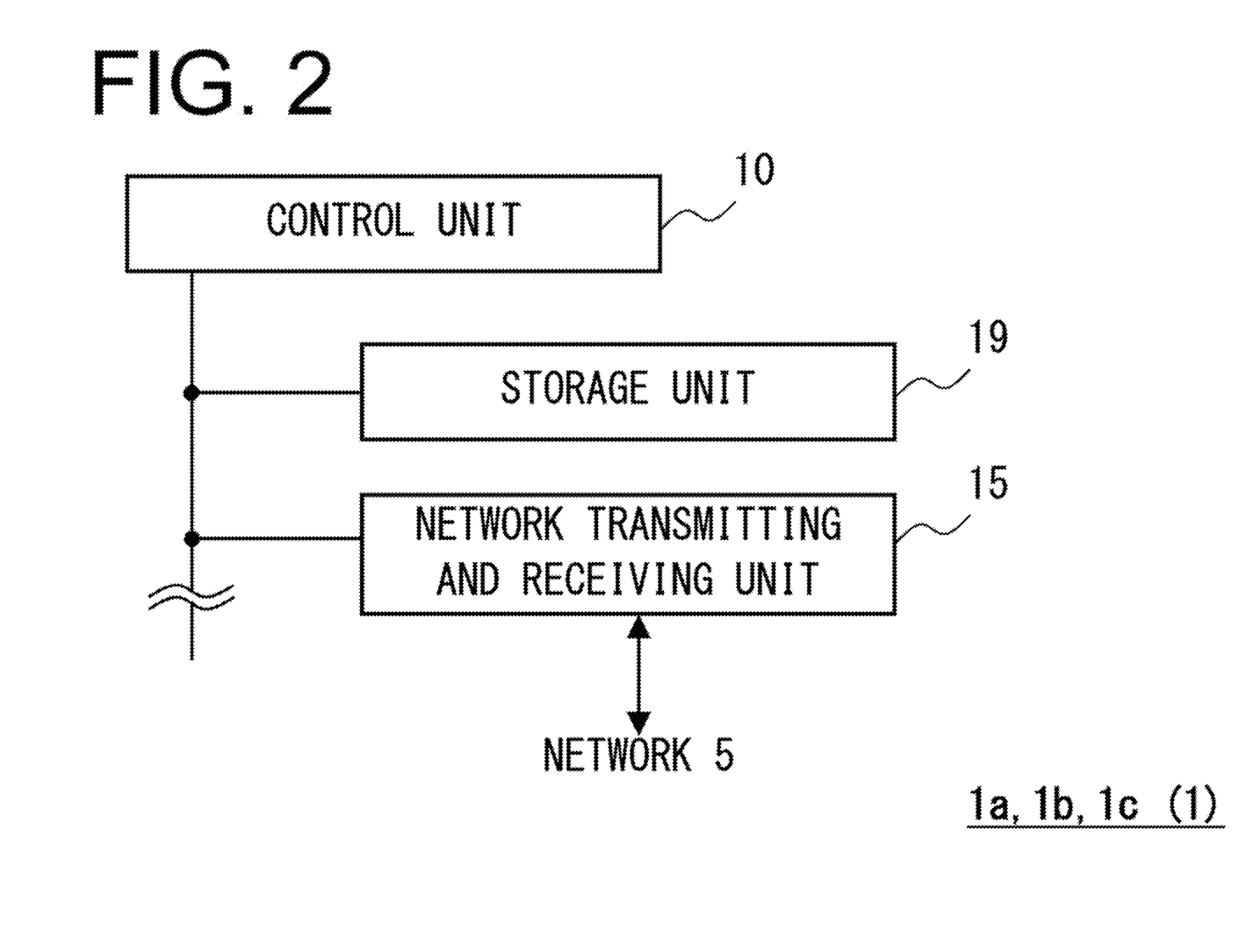
FIG. 2 is a block diagram showing the control configuration of the print server as shown in FIG. 1.

Next, with referring to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, an application-specific processor), or the like.

The control unit 10 reads the control program stored in the ROM or HDD of the storage unit 19, develops the control program in the RAM, and executes it, thereby operating as each unit of the function blocks described later. Further, the control unit 10 controls the entire apparatus according to instruction information input from the administrator terminal or the general terminal.

The network transmitting and receiving unit 15 is a network connection unit including a LAN board, a wireless transmitting and receiving apparatus, or the like, for connecting to the external network 5.

The network transmitting and receiving unit 15 transmits and receives data through a data communication line, and it transmits and receives voice signals through a voice telephone line.

The storage unit 19 is a non-transitory recording medium including semiconductor memory such as ROM (Read Only Memory) and RAM (Random Access Memory), magnetic storage such as HDD (Hard Disk Drive), or the like.

A control program for controlling the operation of the print server 1 is stored in the ROM or HDD of the storage unit 19. The control program includes an OS (Operating System), middleware on the OS, services (daemons), various applications, database data, and the like. Among these, the various applications include the dedicated application as described above.

In the present embodiment, the storage unit 19 stores a program and data for raster in-process processing, which converts vector (line drawing) image data into bitmap image data for printing (raster data). Hereinafter, the raster-in process is abbreviated as "rasterize" or "RIP". The programs and data for this rasterizing process also include commercial libraries, fonts, and the like. In addition, the storage unit 19 also stores information on component apparatuses connected to the same print line, control programs, and the like.

Furthermore, the storage unit 19 may also store user account settings for the industrial printing system X, the other data, and the like.

In addition, in the print server 1, the control unit 10 may be integrally formed, such as a CPU having built-in GPU, chip-on-module package, SOC (System On a Chip), or the like.

Also, the control unit 10 may have built-in RAM, ROM, flash memory, or the like.

[Functional Configuration of Print Server 1]

Figure 3:
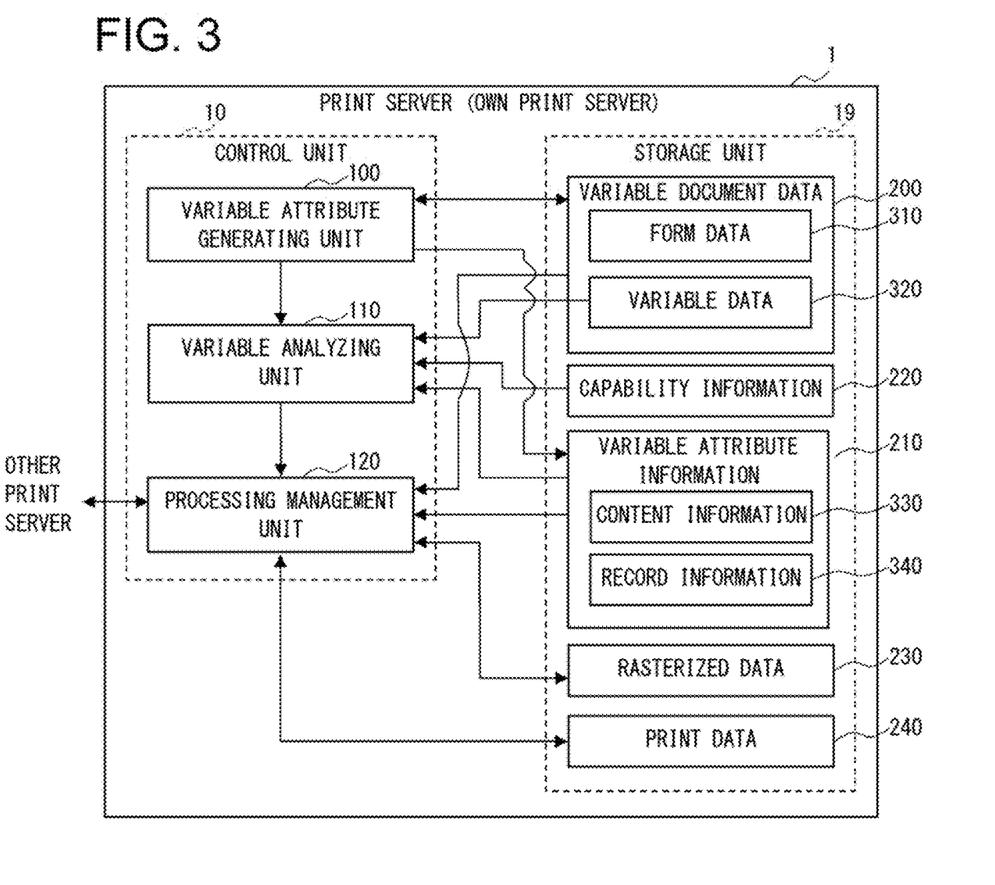
FIG. 3 is a block diagram showing the functional configuration of the print server as shown in FIG. 1.

Here, with reference to FIG. 3, the functional configuration of the print server 1 is described.

The control unit 10 of the print server 1 includes a variable attribute generating unit 100, a variable analyzing unit 110, and a processing management unit 120.

The storage unit 19 stores variable document data 200, variable attribute information 210, capability information 220, rasterized data 230, and print data 240.

The variable attribute generating unit 100 generates variable attribute information 210 including content information 330, which is variable content information of variable data 320 for variable printing.

Further, the variable attribute generating unit 100 may generate the variable data 320 itself for variable printing.

The variable analyzing unit 110 analyzes the content information 330 of the variable attribute information 210 generated by the variable attribute generating unit 100. Thus, the variable analyzing unit 110 determines the other print server that can process the variable content of the variable data 320.

At this time, the variable analyzing unit 110 can determine the other print server for processing the content information 330 based on the capability information 220 stored in the storage unit.

Specifically, in the present embodiment, the variable analyzing unit 110 determines whether or not the variable content can be performed rasterizing process based on the variable document data 200 generated by the variable attribute generating unit 100. As a result, the variable analyzing unit 110 selects the other print server to which rasterizing process is to be distributed.

At this time, the variable analyzing unit 110 can determine whether variable content that cannot be processed by its own print server can be processed by the other print server.

Furthermore, if the other print server does not support processing of the variable content, the variable analyzing unit 110 can change the distribution itself or change the contents of rasterization so as to support processing of variable content.

The processing management unit 120 requests the other print server, which is determined to be capable of processing by the variable analyzing unit 110 to process the variable content. Hereinafter, the other print server to which the processing of each variable content is distributed is also referred to as a "distribution destination."

At this time, in the present embodiment, the processing management unit 120 transmits the content information 330 to the other print server to request processing. In addition, the processing management unit 120 may acquire the rasterized data 230, which is generated by the other print server based on the content information 330. Then, the processing management unit 120 can import the rasterized data 230 into the variable data 320 and perform rasterizing process each record of the variable document data 200. In this rasterizing process, the processing management unit 120 generates print data 240 for each record based on the rasterization data 230 of the variable content.

The processing management unit 120 generates a job ticket including the print data 240 that has been performed rasterizing process and causes the printing apparatus 2 in the printing step as the component apparatus to print it. The printed matter may be post-processed by the post-processing apparatus 3 in the post-processing step.

The processing management unit 120 can also send a job ticket including the print data 240 to the other print server to perform processing request of printing and post-processing.

The variable document data 200 is data of a variable printing job (hereinafter referred to as a "variable job") in which a variable document used in variable printing and various data related thereto are put together.

The variable document data 200 may be described, for example, in JDF (Job Description Format) and/or JMF (Job Messaging Format).

The variable attribute information 210 is data including variable contents and attributes of each record of the variable data 320 for variable printing. The variable attribute information 210 is generated as information of each record or content when the variable data 320 is generated.

In the present embodiment, the variable attribute information 210 may be data in a format that is easy to handle as a database similar to the variable data 320 as described later.

The capability information 220 is a table or the like, showing information indicating resources (capabilities) capable of being processed in the rasterizing process by the component apparatuses provided at the site and managed by the print server 1 at that site.

The capability information 220 is shared among the print servers 1. That is, each print server 1 stores in the storage unit 19 the capability information 220 corresponding to each site of the plurality of print servers 1 (group) that can cooperate with each other.

The rasterized data 230 is data generated by the other print server based on the content information 330. In the present embodiment, the rasterized data 230 may be data containing image data in which variable content acquired by other print servers based on the content information 330 has been performed rasterizing process. Specifically, the rasterized data 230 may be, for example, electronic document data such as PDF (Portable Document Format), or the like, containing image data (hereinafter simply referred to as "PDF") The image data in this PDF may be, for example, TIFF or the other bitmap data. Additionally, the image data may be lossless or lossy compressed.

The print data 240 is data of a print manuscript in which a design is set according to the order. The print data 240 may be, for example, PDF, PS (Postscript) data, other vector data, manuscript format data, other raster image data, and the like.

In addition, the storage unit 19 may include job tickets and distribution condition data related to job distribution.

Among these, the job ticket is setting data for requesting a print or post-processing job. This setting includes necessary settings including, for example, imposition position and post-processing parameters, or the like. The job tickets may also be written in JDF and/or JMF.

(Details of Variable Document Data 200)

Then, details of the variable document data 200 is described.

In the present embodiment, variable document data 200 includes form data 310 and variable data 320. These data may be included in the variable document data 200 as attribute data.

The form data 310 is data containing a common form, or the like, for performing variable printing. The common form becomes data of a part that basically does not change at the time of printing. Specifically, the form data 310 may be data such as PDF (Portable Document Format), PDL (Page Description Language), and PPML (Personalized Print Markup Language) in XML (Extensible Markup Language) format, or the like. Among these, the PDF may be PDF/X, which is a subset of the standard PDF defined by the International Organization for Standardization (ISO15930), a simpler PDF, or the like.

Furthermore, the form data 310 may include, for example, image data such as jpg, gif, BMP, PNG, TIFF, other document data, and other data. Additionally, the form data 310 may include layout information that defines the layout, or the like, on the page. The layout information may include format information such as the position (coordinates) and size of the form on the page, font size of the variable data 320, left alignment, center alignment, right alignment, or the like.

In addition, the form data 310 may also include definitions of the elements of the variable data 320, data describing the items of the elements, data indicating the target of the attributes, and the like.

The variable data 320 is data for variable output that changes the print content at the time of printing. The variable data 320 may be embedded in the variable document data 200 in, for example, a table format including multiple records, a database format such as XML, or the like.

Alternatively, the variable data 320 may be added separately as a file in a format that is easy to handle as a database. In this case, the variable data 320 may be a database such as a tab-separated or comma-separated file, a spreadsheet application file, other types of database files, a list file, or the like.

In addition, the variable document data 200 may include job type, project (order) name, various types of processing attribute information, print resources, and the like. The processing attribute information may be set the number of copies, whether or not collation is performed, whether or not recording is performed, the number of mm to be cut, the print direction, the print state, the priority order, and the like. Among these, the job type includes a job in the printing step (print job) or a job in the post-processing step (post-processing job). The print resource is information on various resources necessary for printing instructions such as an ICC profile, or the like. The other resource data required for printing are also included in this print resource.

Further, at least part of the variable document data 200 may be described in a format compatible with JDF and/or JMF.

Figure 4:
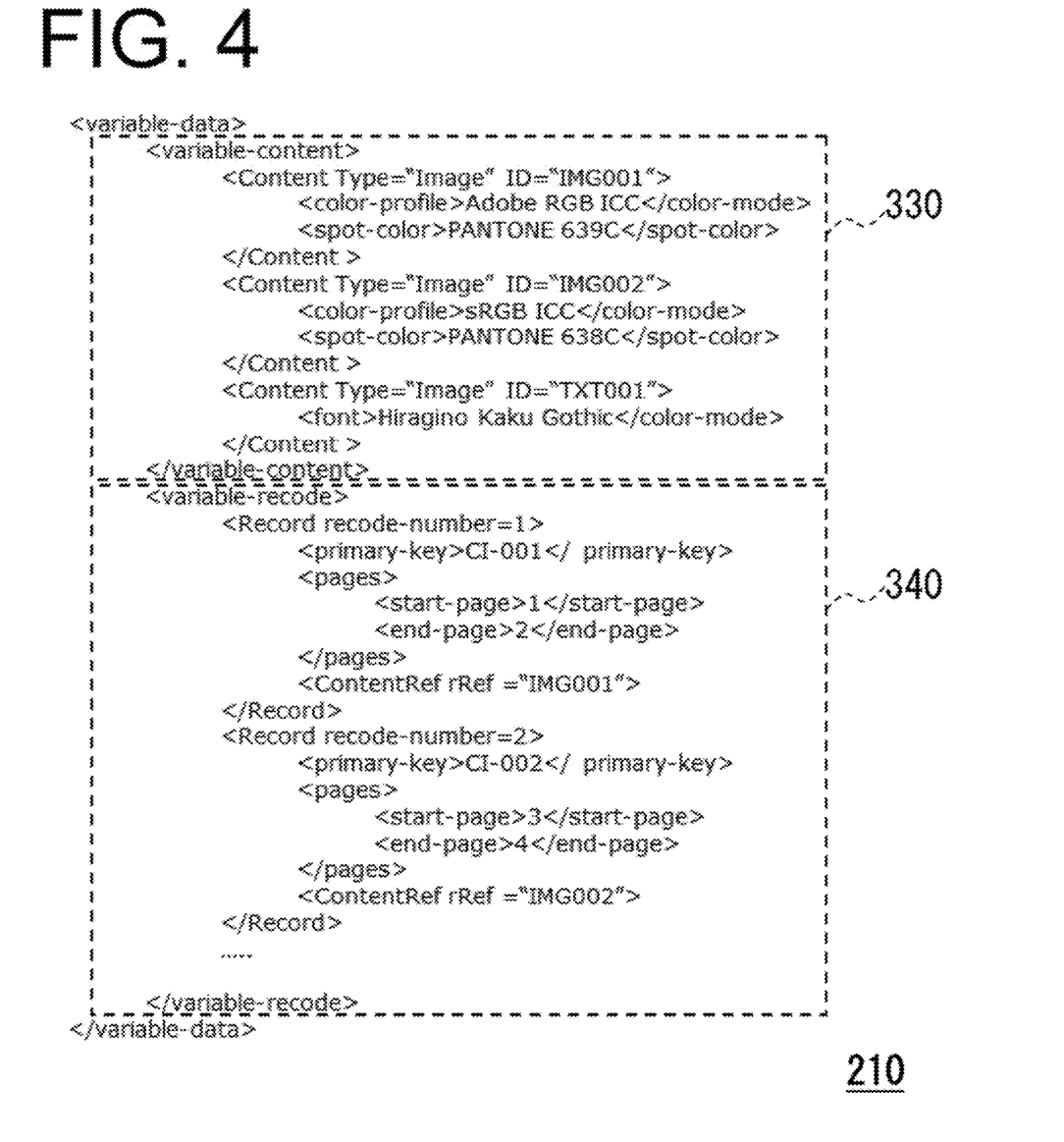
FIG. 4 is a conceptual diagram of the variable attribute information as shown in FIG. 3.

(Details of variable attribute information 210) Then, with reference to FIG. 4, the details of the variable attribute information 210 are described.

In the present embodiment, the variable attribute information 210 includes content information 330 of each variable content and record information 340 of each record.

The content information 330 is variable content information of the variable data 320 for variable printing. The variable content corresponds to content data of a "component" on each page.

Specifically, for example, the content information 330 includes resource-related elements such as "content", "font", "color-profile", and "spot-color" for each "component" object unit.

The "content" is an element indicating various information of the variable content. Specifically, "content" includes "type", "ID", "URL", and the like. Among these, "type" is data indicating the type of variable content. In the present embodiment, the "text" or the "image" can be set as the type. The "ID" is the ID (Identification) of this element. The "URL" indicates the location of a file, or the like, as a storage location of the original data of the variable content.

The "font" is information indicating a character font, or the like, when the type of the variable content is the "text".

The "color-profile" is information indicating a color profile when the type of the variable content is the "image".

The "spot-color" is information such as spot colors, or the like, when the type of the variable content is the "image". For the spot colors, it is possible to specify colors other than normal CMYK (Cyan, Magenta, Yellow, and Key plate), such as colors by a commercial library, which is described later, or the like.

The record information 340 is information of each record of the variable data 320. That is, the record information 340 includes a record number, a primary key for identifying the record, and processing attribute information of the record in units of records.

Specifically, for example, the record information 340 includes elements such as "record", "pages", "ContentRef", "color", "resolution", and the like.

The "record" indicates data in units of records. The "record" includes "recode-number" indicating the record number of the variable data 320 as an attribute.

The "primary-key" is the variable data value that is the primary key. The primary key is set with a value that can identify a record, such as a customer ID, or the like.

The "pages" indicates the page number containing the variable data 320 of the record. For example, pages such as "pages 1 to 10" as the page numbers are designated by "start-page" to "end-page".

The "ContentRef" indicates the storage location of the variable content. The storage location may indicate a file location, or the like, similar to the "URL" of the variable content as described above.

The "color" is a data value of color information. For the color information, for example, color or monochrome can be designated as a "color-mode". Furthermore, the color information may include setting values such as "spot-color", or the like.

The "resolution" is a resolution value of the variable data 320. For example, if the record contains high-resolution content such as 1200 dpi (dot per inch), the set value is "1200 dpi", or the like.

In addition, the record information 340 may include information such as an expiration date, a print component (content) ID (content ID), content source data as other processing attribute information, or the like. Furthermore, the record information 340 may separately include attributes and the rasterized data 230 when the record is rasterized.

(Details of Capability Information 220)

Next, details of the capability information 220 is described.

The capability information 220 includes data indicating the processing capability of the print server 1 when performing rasterization. The capability information 220 includes, for example, color profile information, spot color information, font information, image processing information, and plug-in information.

The color profile information is color gamut (color profile) information. The color profile information includes data such as an ICC profile, or the like.

The spot color information is information of the spot color. Specifically, the spot color information includes information on commercial libraries related to color designation. The commercial libraries include PANTONE® HKS, DIC®, TOYO®, and the like.

The font information is information on fonts such as usable commercial fonts, and the like.

The image processing information is information indicating available image processing and its capability. The image processing information includes, for example, image enhancement, presence/absence of skew correction, and the like. Furthermore, the image processing information may also include information about whether or not processing is possible depending on the resolution and speed.

The plug-in information is information related to plug-in processing. The plug-in information includes information of processing and capability such as imposition, preflight, preflight profile, and the like, as the plug-in processing.

In addition, the performance information 220 may include the information on available processing capacity (hereinafter referred to as "processing capability") of the printing process step (printing step) by the printing apparatus 2 and the post-processing process step (post-processing step) of the post-processing apparatus 3.

Here, the control unit 10 in the print server 1 caused to function as a variable attribute generating unit 100, a variable analyzing unit 110, and a processing management unit 120 by executing the control programs stored in the storage unit 19.

Also, each unit of the print server 1 described above serves as a hardware resource for executing the variable printing method according to the present disclosure.

In addition, a part or any combination of the functional configurations as described above may be configured in terms of hardware or circuits by using an IC, programmable logic, FPGA (Field-Programmable Gate Array), or the like.

[Variable distributing process by Print Server 1]

Next, with reference to FIGS. 5 to 8, a variable distribution processing for executing the variable printing method by the print server 1 according to the embodiment of the present disclosure is described.

Figure 5:
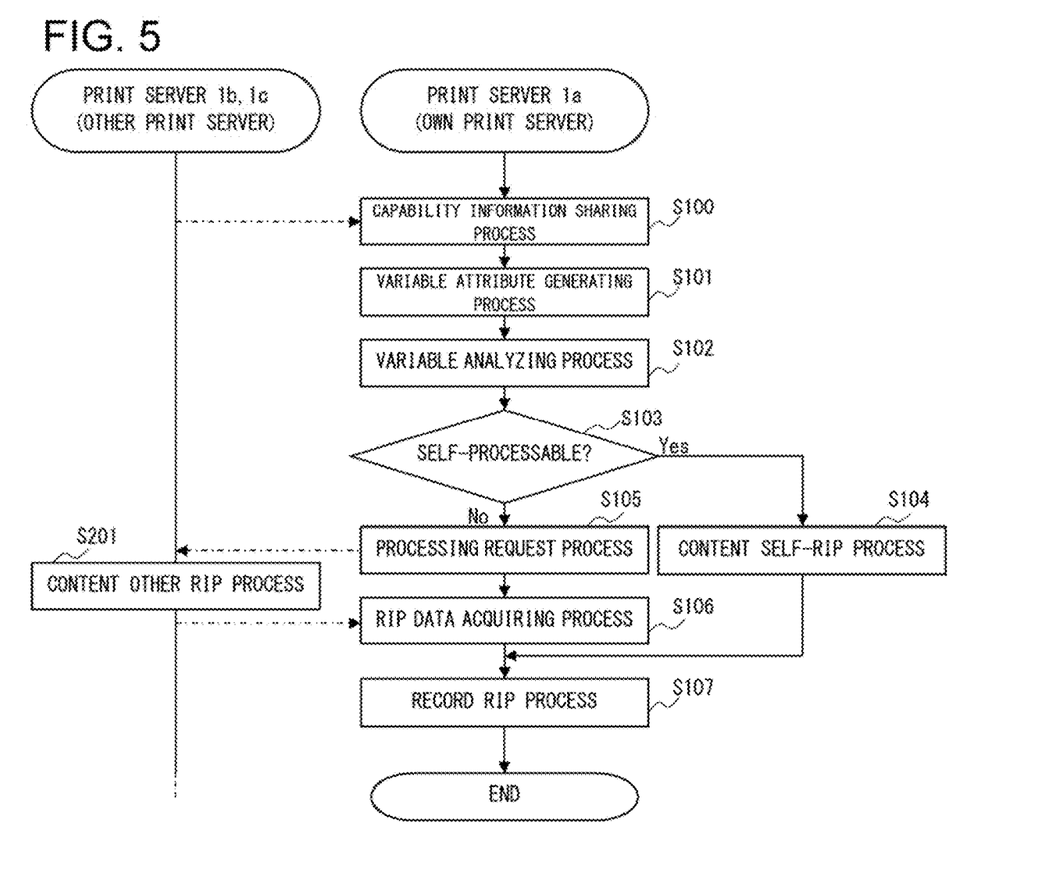
FIG. 5 is a flowchart of variable distributing process according to an embodiment of the present disclosure.

In the variable distributing process of the present embodiment, variable data 320 for variable printing is created. When creating the variable data 320, the variable attribute information 210 including the content information 330, which is the information of the variable content of the variable data 320 for variable printing, is generated. Then, the content information 330 of the generated variable attribute information 210 is analyzed to determine the other print server capable of processing the variable content of the variable data 320. Then, the other print server determined to be capable of processing is requested to process the variable content.

In the variable distributing process according to the present embodiment, as a representative example, the print server 1a of the print line A (site) is used as the own print server (processing request side). On this basis, an example that the control unit 10 of this print server 1a mainly executes the program stored in the storage unit 19 by using hardware resources in cooperation with each unit is described.

Hereinafter, with reference to the flowchart of FIG. 5, the details of the variable distributing process is described step by step.

(Step S100)

Firstly, the processing management unit 120 performs a capability information sharing process.

The processing management unit 120 shares the capability information 220 among the print servers 1. In the present embodiment, the processing management unit 120 transmits the capability information 220 to the other print servers at each site that are peer-to-peer connected and capable of cooperation, for example. The other print servers that have received this store the shared capability information 220 in their storage unit 19.

(Step S101)

Then, the variable attribute generating unit 100 performs a variable attribute generating process.

The variable attribute generating unit 100 acquires variable document data 200 to be subjected to peer-to-peer distributed processing from an administrator terminal, a prepress apparatus, or the like.

The variable document data 200 may be created from the template data on the GUI (Graphical User Interface) by causing the administrator terminal to execute a web browser or a dedicated application.

The variable attribute generating unit 100 generates variable attribute information 210 containing content information 330 and record information 340 when acquiring the variable document data 200. Among them, the content information 330 may include information on variable content types, fonts, color profiles, and spot colors.

Figure 6:
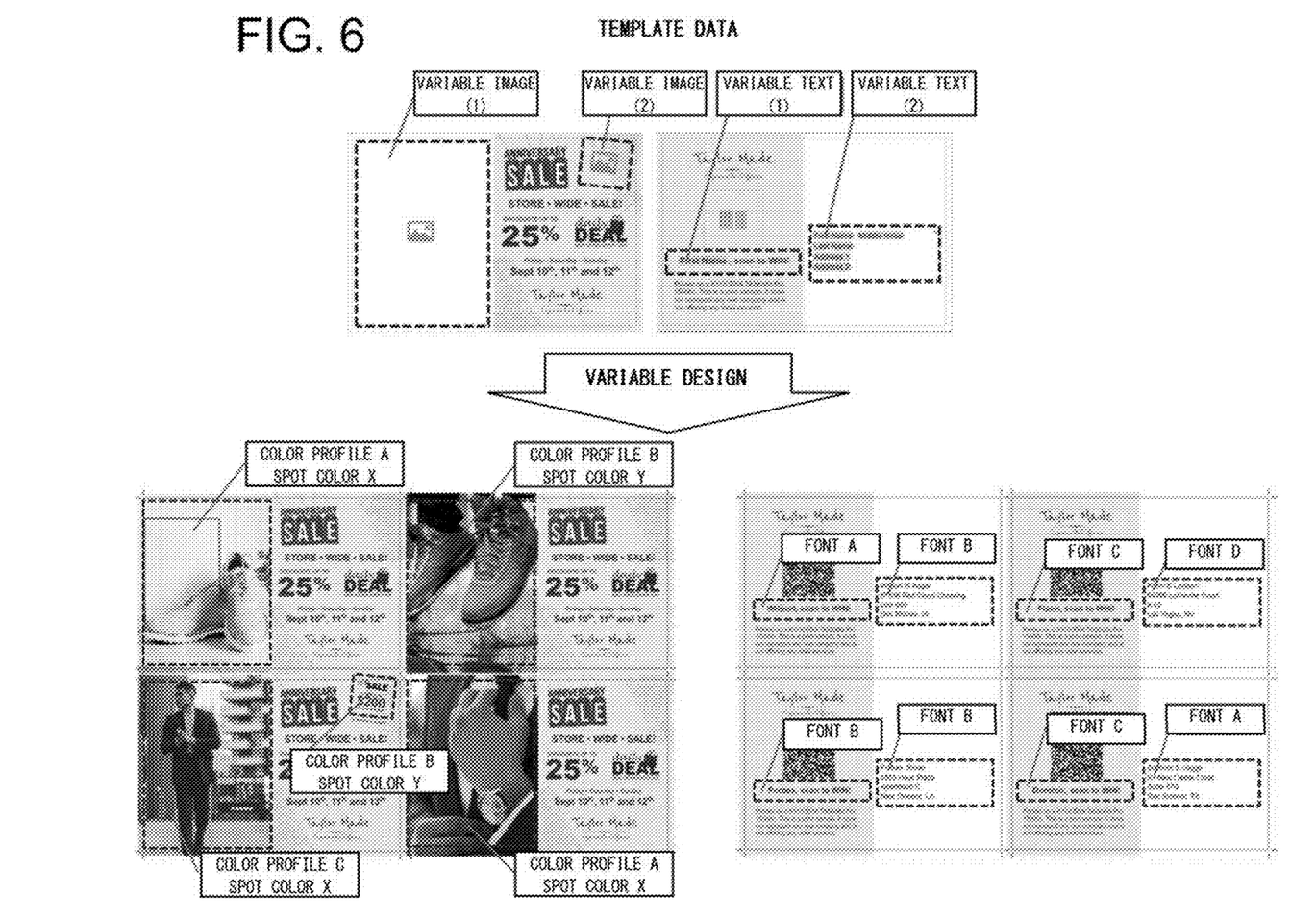
FIG. 6 is a conceptual diagram of variable attribute generation processing as shown in FIG. 5.

With reference to FIG. 6, an example of generating such variable data 320 is described.

In this example, "variable image (1)", "variable image (2)", "variable text (1)", and "variable text (2)" are varied for each record as variable contents.

For example, in the "variable image (1)", each image is changed as like color profiles A to C and spot colors X to Z for each record. Also, as like "variable image (2)", the image may or may not exist, and if existing, the color profile or spot color may be different for each image.

Furthermore, in the "variable text (1)" and the "variable text (2)", fonts A to D are used differently for each record.

The variable attribute generating unit 100 can set the designation of the content information 330 of each of these variable contents in the variable attribute information 210 according to the user's designation by the GUI.

(Step S102)

Then, the variable analyzing unit 110 performs a variable analyzing process.

The variable analyzing unit 110 analyzes the content information 330 of the variable attribute information 210 and checks whether the print server itself can perform rasterizing process or not.

Then, the variable analyzing unit 110 selects the other print server capable of performing rasterizing process the variable content that cannot be processed by the own print server.

At this time, for example, the variable analyzing unit 110 can determine whether variable content can be processed based on the capability information 220 acquired from each print server 1 and stored in the storage unit 19.

Specifically, in the case that "type" of the "content" of the content information 330 is "text", and if the character font specified in the "font" is included in the font information of the capability information 220, the variable analyzing unit 110 can be determined to be capable of processing.

On the other hand, in the case that the "type" of the "content" of the content information 330 is "image", if the color profile and spot color specified in "color-profile" and "spot-color" are included in the color profile information and the spot color information of the capability information 220, the variable analysis unit 110 can determine to be capable of processing.

The variable analyzing unit 110 can similarly determine other attributes.

(Step S103) Then, the variable analyzing unit 110 determines whether or not self-processable. Specifically, the variable analyzing unit 110 determines whether or not the own print server is capable to perform the rasterizing process based on the analysis as described above. The variable analyzing unit 110 determines Yes if the own print server is capable of processing it. The variable analyzing unit 110 determines No if the other print server capable of processing is selected.

In the case of Yes, variable analysis section 110 advances the process to step S104.

In the case of No, the variable analyzing unit 110 advances the process to step S105.

(Step S104)

If the own print server is capable of processing (self-processable), the processing management unit 120 performs a content self-RIP process.

The processing management unit 120 performs rasterizing process this variable content and stores the rasterized data 230, which is generated by the process, in the storage unit 19.

After that, the processing management unit 120 advances the processing to step S107.

(Step S105)

If the other print server capable of processing is selected, the processing management unit 120 performs processing request process.

The processing management unit 120 requests the other print server determined to be capable of processing by the variable analyzing unit 110 to process the variable content. At this time, the processing management unit 120 transmits the content information 330 to the other print server to request processing.

Figure 7:
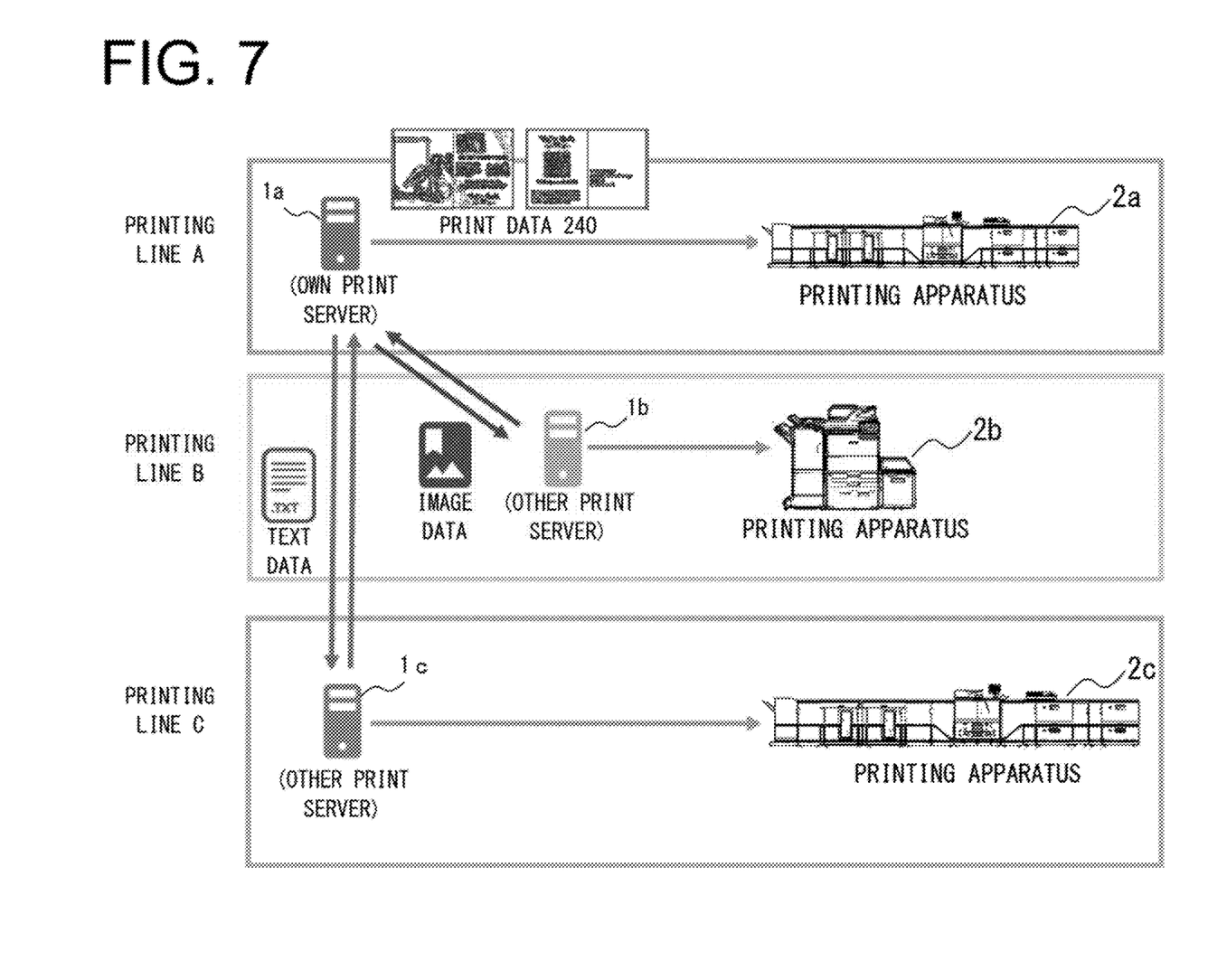
FIG. 7 is a conceptual diagram of the processing request processing as shown in FIG. 5.

With referring to FIG. 7, a specific example for this processing is described.

In the present embodiment, the processing management unit 120 makes the other print server capable of processing process the variable content.

Specifically, processing management unit 120 generates a job ticket containing the content information 330. The processing management unit 120 then transmits this job ticket to the other print server selected by the variable analyzing unit 110 to request processing.

Figure 8:
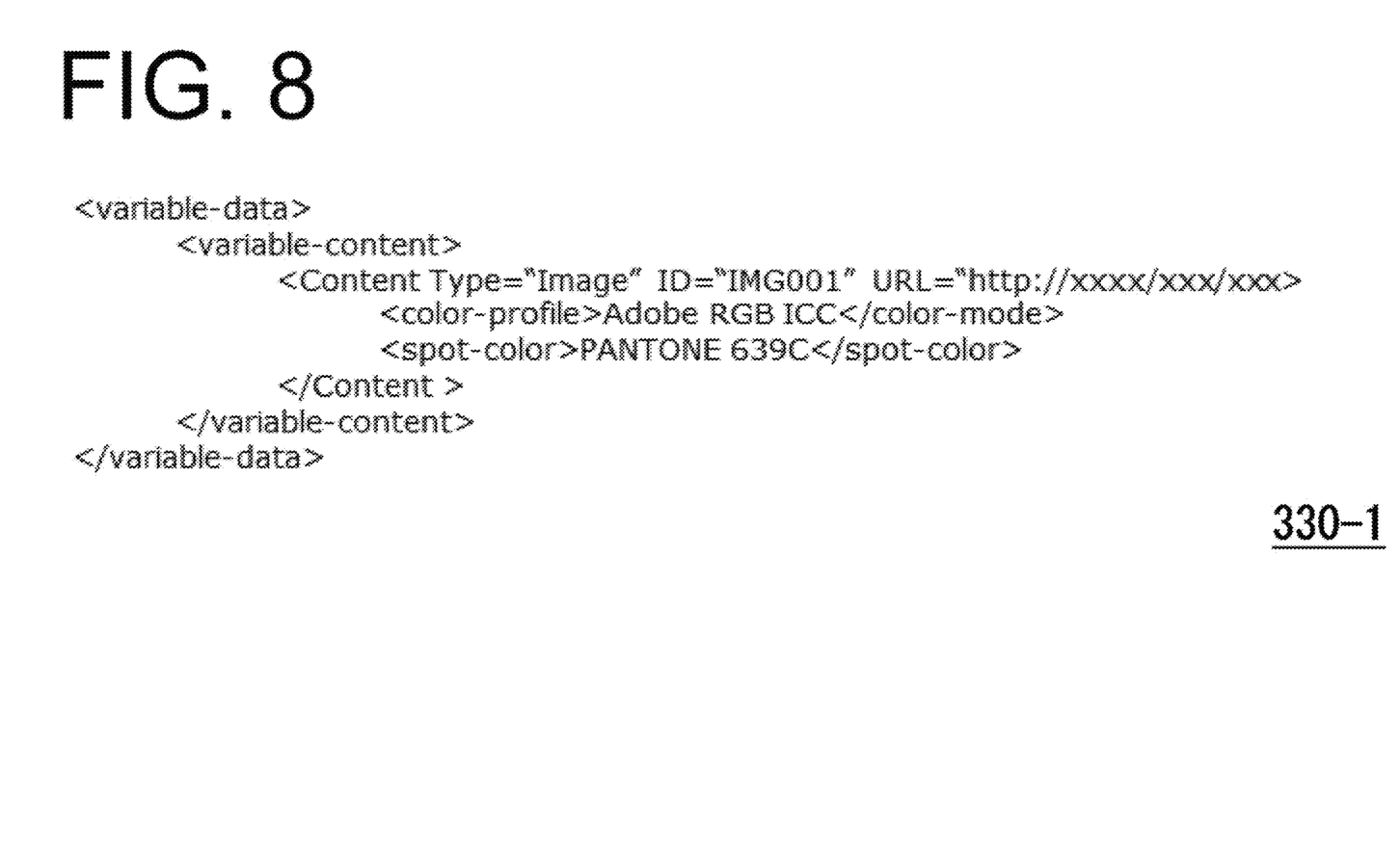
FIG. 8 is a conceptual diagram of content information transmitted in the process request process shown in FIG. 5.

FIG. 8 shows an example of content information 330-1 included in this job ticket.

Here, the processing management unit 120 extracts the content information 330-1, which is corresponding to the variable content for which processing is requested from the variable attribute information 210. Then, the processing management unit 120 includes the storage location of the variable content as "URL" from "ContentRef" of the record information 340 in the job ticket.

(Step S201)

Here, a content other RIP process performed in the other print server is described.

The control unit 10 of the other print server acquires the job ticket including the content information 330 and processes the variable content.

Specifically, the control unit 10 of the other print server acquires the original data of the variable content by referring the "URL" in the content information 330.

Based on this, the control unit 10 of the other print server rasterizes by using a program for rasterizing process based on the content information 330 to generate rasterized data 230. At this time, if the "type" of the content information 330 is the "text", the rasterization is performed with the designated character font. On the other hand, if the "type" is the "image", rasterization is performed with the specified color profile and spot color.

Then, the control unit 10 of the other print server transmits the generated rasterized data 230 to the own print server.

(Step S106) Processing by the own print server is explained again. Here, the processing management unit 120 performs RIP data acquiring process.

The processing management unit 120 acquires the rasterized data 230, which is generated based on the content information 330 by the other print server, and stores it in the storage unit 19.

(Step S107)

Here, the processing management unit 120 performs record RIP process.

For each record of the variable document data 200, the processing management unit 120 imports the variable content rasterized data 230 into the variable data 320 and performs rasterizing process. This rasterized data 230 of the variable content is data performed rasterizing process by the other print server or the own print server.

As a result, the processing management unit 120 generates print data 240 for each record.

Then, the processing management unit 120 generates a job ticket containing the print data 240 and causes it to be processed by a component apparatus managed in the own print server or the other print server.

If the job type is the print job, the processing management unit 120 commands the selected printing apparatus 2 to print the record included in the job ticket. As a result, the printing apparatus 2 can print out each record of the variable document data 200.

If the job type is the post-processing job, the processing management unit 120 causes the post-processing apparatus 3 to perform post-processing. As a result, post-processing of the printed matter can also be performed by the post-processing apparatus 3.

With the above, the variable distributing process according to the embodiment according to the present disclosure completes.

As configured in this way, the following effects can be obtained.

In typical production printing, in order to process a large volume of printing in a short period of time, print processing may be distributed among a plurality of printing apparatuses. Such distributed processing requires a management server that transmits and manages the print data to the plurality of printing apparatuses.

In other words, with the typical technology, it has been necessary to build a system for distributed processing centered on the management server.

Further, variable printing is the most characteristic digital printing job, and one of the purposes for which printing companies introduce digital production printing apparatuses. Since variable printing is used for personalized printed matter, and the like, it is often the case that a large amount of printing is required.

In such variable data for variable printing, variable content such as text and images may be added. In the variable content, different resources may be specified for each variable content. For example, the text may specify a specific font, and the image may specify a specific color profile or spot color.

In such case, since the target printing apparatus does not always support all of these resources, intended printing may not be possible. In other words, there have been cases where variable content cannot be printed correctly only at one site.

On the other hand, the industrial printing system X according to the present embodiment is an industrial printing system that includes a plurality of print servers 1 and performs variable printing for production printing, each of the plurality of print servers 1 including: a variable attribute generating unit 100 that generates variable attribute information 210 having content information 330 that is information of variable content of variable data 320 for variable printing; a variable analyzing unit 110 that analyzes the content information 330 of the variable attribute information 210 generated by the variable attribute generating unit 100 and determine other print server capable of processing the variable content of the variable data 320; and a processing management unit 120 that requests the other print server determined to be capable of processing by the variable analyzing unit 110 to process the variable content.

With this configuration, even variable data 320 containing variable contents, which cannot be processed by the print server 1 at one site, can be printed as intended by using the other print server, which is distributed and linked.

In addition, there is no need for a management server for distributed processing, and peer-to-peer distributed processing can flexibly be performed between the print servers 1 and efficiently distribute and print. That is, in the industrial printing system X according to the present embodiment, there is no need to separately prepare a special management server for distributed processing of the variable document data 200.

Further, the variable data is often created without considering the capabilities, or the like, of the printing apparatus. Also, in personalized printing such as DM, or the like, only the variable content is often replaced and reprinted. In such cases, the variable content cannot be printed, correctly.

On the other hand, in the industrial printing system X according to the present embodiment, it is possible to correctly print the variable content by performing rasterizing process the variable content in the other print server capable of processing the variable content.

Further, in the industrial printing system X according to the present embodiment, the content information 330 includes information on the variable content type, font, color profile, and spot color.

With this configuration, the other print server corresponding to the variable content type, font, color profile, and spot color can be selected in the content information 330 of the variable content. Therefore, the possibility of realizing more intended printing increases.

In the industrial printing system X according to the present embodiment, each of the plurality of print servers 1 further includes a storage unit 19 that stores capability information 220 indicating the processing capability of rasterizing process, and the variable analyzing unit 110 determines the other print server for the content information 330 based on the capability information stored in the storage unit 19.

With this configuration, it is possible to compare the content information 330 with the capability information 220 of the other print servers, select a more appropriate print server, and request processing of variable content.

In the industrial printing system X according to the present embodiment, the variable analyzing unit 110 determines whether or not the variable content that is not capable to be processed by the own print server is capable to be processed by the other print server.

With this configuration, only variable content that cannot be processed by the own print server can be processed by the other print server. Therefore, it is possible to improve the efficiency of processing variable content as a whole.

In the industrial printing system X according to the present embodiment, the processing management unit 120 transmits the content information 330 to the other print server to request processing, acquires rasterized data 230 generated by the other print server based on the content information 330, imports the rasterized data 230 into the variable data 320, and perform rasterizing process.

With this configuration, it is possible to acquire the rasterized data 230 from other print servers, and the correct print data 240 including variable content can be generated and printed by the own print server.

Other Embodiments

In addition, in the above-described embodiment, an example has been described in which the own print server first shares the capability information 220 and selects the other print server capable of processing.

However, it is also possible to be a configuration such that sending only the content information 330 of the variable content that cannot be processed out of the variable attribute information 210 to the other print server, checking whether the processing is possible or not by and the other print server, and returning the check result. In this case, the content information 330 may be broadcasted to the plurality of print servers 1, and the print server 1 that responds the most to the conditions may be selected as the other print server.

With this configuration, it is possible to determine and select the suitable other print server without sharing the capability information 220.

Further, in the above-described embodiment, an example of determining the other print server based on the content information 330 and the capability information 220 has been described.

However, the variable analyzing unit 110 may also consider the schedule, performance, cost, and other factors of the plurality of print servers 1 to determine the other print server. In addition, the variable analyzing unit 110 can also consider other factors not included in the capability information 220, such as the number of variable contents to be requested and the delay of the network 5, or the like, at the time of selection.

Further, in the above-described embodiment, an example of containing the content information 330 in the job ticket and perform processing request to the other print server has been described.

However, it is also possible to send the content information 330 itself directly to the other print server to request processing. In such case, the own print server can also acquire the processed rasterized data 230 directly from the other print server.

Furthermore, in the above-described embodiment, an example that only the storage location of the original data of the variable contents is designated to the other print server is described. However, it is also possible to send the original data itself from the own print server to the other print server to request processing.

By configuring in this way, it becomes possible to deal with a more flexible configuration.

Furthermore, the variable analyzing unit 110 may be capable of scheduling execution of rasterizing process in the selected other print server. In this case, the priority for each variable content can be set, and the scheduling can be performed.

Also, if there is an error in the rasterizing process or the quality is degraded in the other print server, this process result can be acquired, and the other print server can be selected again.

By configuring in this way, a more appropriate other print server can be determined. As a result, the time and effort of manual adjustment can be reduced, processing efficiency can be improved, and running costs can be reduced. Further, by requesting processing based on the schedule, it is possible to adjust processing requests due to delays, and the like.

Further, in the above-described embodiment, an example in which the content information 330 is fixed at the time of generation has been described.

However, if the variable content cannot be processed by the own print server, it may be possible to prompt the creator of the variable document data 200 to change the content information 330 or to change the content information 330 according to the change conditions. Specifically, if the font, color profile, or spot color is not supported by the other print server, the change condition to be supported can be set. At this time, the conditions may be combined or prioritized. In such case, change conditions can be set by using a script language, a macro language, or the like.

As a result, even if the other print server cannot be selected, it is possible to change the settings according to the change condition and appropriately rasterize and output.

In addition, it is possible to change the process to the own print server or change the process request itself according to the result of the process or the schedule change in the other print server, or the like. Specifically, for example, when there is a delay, it is possible to change the number of variable contents to be processed, the number of pages, the color profile to be used, and the like.

By configuring in this way, even if trouble occurs, the job can be executed by distributed processing.

In addition, the variable analyzing unit 110 does not always select one print server 1 as the other print server to be distributed to, but it can select a plurality of appropriate print servers 1.

In this case, it may be possible to set which print server 1 is to be selected as the other print server from the plurality of selected print servers 1 according to the order of priority, or to select at random.

With this configuration, even variable data 320 that requires a large amount of processing can be appropriately distributed.

Further, in the above-described embodiment, an example of mainly distributing the rasterization of variable printing has been described. However, print jobs and post-processing jobs can also be distributed by selecting the other print servers as distribution destinations. Furthermore, the distributed processing in units of records is also possible.

In such case, the print servers 1 for the distribution destination may be separate for the printing process and the post-processing process. Furthermore, both print jobs and post-processing jobs may be performed distributed processing.

By configuring in this way, printing jobs and post-processing jobs can be performed distributed processing more efficiently.

Also, in terms used in this specification, the singular forms "a," "an," and "the" include plural forms unless the context clearly dictates otherwise.

Further, the configuration and operation of the above-described embodiment are examples, and needless to say, they can be modified and executed as appropriate without departing from the aim of the present disclosure.

What is claimed is:

1. An industrial printing system having a plurality of print servers and which performs variable printing for production printing, each of the plurality of print servers comprising:
   a variable attribute generating unit configured to generate variable attribute information having content information that is variable content information of variable data for variable printing, wherein the variable data comprises variable content;
   a variable analyzing unit configured to analyze the content information of the variable attribute information generated by the variable attribute generating unit and determine other print server capable of processing the variable content; and
   a processing management unit configured to request the other print server determined to be capable of processing by the variable analyzing unit to process the variable content;
   wherein:
   the processing management unit transmits the content information to the other print server to request processing, acquires rasterized data generated by the other print server based on the content information, imports the rasterized data into the variable data, and perform a rasterizing process.

2. The industrial printing system according to claim 1, wherein:
   the content information includes information on variable content type, font, color profile, and spot color.

3. The industrial printing system according to claim 2, wherein:
   each of the plurality of print servers,
   further comprising a storage unit that stores capability information indicating processing capability in rasterizing process, and
   the variable analyzing unit determines the other print server for the content information based on the capability information stored in the storage unit.

4. The industrial printing system according to claim 3, wherein:
   the variable analyzing unit determines whether or not the variable content that is not capable to be processed by the print server comprising the variable analyzing unit is capable to be processed by the other print server.

5. A print server for an industrial printing system that performs variable printing for production printing, comprising:
- a variable attribute generating unit configured to generate variable attribute information having content information that is variable content information of variable data for variable printing, wherein the variable data comprises variable content;
- a variable analyzing unit configured to analyze the content information of the variable attribute information generated by the variable attribute generating unit and determine other print server capable of processing the variable content; and
- a processing management unit configured to request the other print server determined to be capable of processing by the variable analyzing unit to process the variable content;

wherein:
the processing management unit transmits the content information to the other print server to request processing, acquires rasterized data generated by the other print server based on the content information, imports the rasterized data into the variable data, and perform a rasterizing process.

6. The print server according to claim 5, wherein:
the content information includes information on variable content type, font, color profile, and spot color.

7. The print server according to claim 6, further comprising:
- a storage unit that stores capability information indicating processing capability in rasterizing process; and
- the variable analyzing unit determines the other print server for the content information based on the capability information stored in the storage unit.

8. The print server according to claim 7, wherein:
the variable analyzing unit determines whether or not the variable content that is not capable to be processed by the print server comprising the variable analyzing unit is capable to be processed by the other print server.

9. A variable printing method performed by an industrial printing system having a plurality of print servers performing variable printing for production printing, comprising the steps of:
- generating variable attribute information having content information that is variable content information of variable data comprising variable content, wherein the variable data is for variable printing;
- analyzing the content information of the generated variable attribute information;
- determining other print server capable of processing the variable content; and
- requesting the other print server determined to be capable of processing to process the variable content;

wherein the method further comprises the steps of:
- transmitting the content information to the other print server to request processing;
- acquiring rasterized data generated by the other print server based on the content information;
- importing the rasterized data into variable data; and
- performing a rasterizing process.

10. The variable printing method according to claim 9, wherein:
the content information includes information on variable content type, font, color profile, and spot color.

11. The variable printing method according to claim 10, further comprising steps of:
- storing capability information indicating processing capability in rasterizing process; and
- determining the other print server for the content information based on the stored capability information.

12. The variable printing method according to claim 11, wherein:
determining whether or not the variable content that is not capable to be processed by the print server comprising the variable analyzing unit is capable to be processed by the other print server.

* * * * *